(12) United States Patent
Lambert

(10) Patent No.: US 6,750,904 B1
(45) Date of Patent: Jun. 15, 2004

(54) CAMERA SYSTEM FOR THREE DIMENSIONAL IMAGES AND VIDEO

(75) Inventor: Howard Shelton Lambert, Southampton (GB)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/272,270

(22) Filed: Mar. 19, 1999

(30) Foreign Application Priority Data

Oct. 31, 1998 (GB) ............................................. 9823760

(51) Int. Cl.[7] .......................... H04N 5/225; H04N 13/02
(52) U.S. Cl. ...................................... 348/218.1; 348/47
(58) Field of Search ................................ 348/373, 360, 348/47, 48, 42, 43, 218.1, 264, 59; 396/327, 326, 325; 359/470

(56) References Cited

U.S. PATENT DOCUMENTS

| | | | | |
|---|---|---|---|---|
| 5,276,478 A | * | 1/1994 | Morton | 355/22 |
| 5,640,273 A | * | 6/1997 | Hamagishi et al. | 359/462 |
| 6,069,650 A | * | 5/2000 | Battersby | 348/59 |
| 6,084,978 A | * | 7/2000 | Taylor et al. | 382/154 |
| 6,108,029 A | * | 8/2000 | Lo | 348/43 |
| 6,157,751 A | * | 12/2000 | Olson et al. | 382/304 |
| 6,185,042 B1 | * | 2/2001 | Lomb et al. | 359/619 |
| 6,188,518 B1 | * | 2/2001 | Martin | 359/464 |
| 6,262,743 B1 | * | 7/2001 | Allio | 345/427 |

FOREIGN PATENT DOCUMENTS

| | | | | |
|---|---|---|---|---|
| GB | 2173667 | 10/1986 | | H04N/13/04 |
| JP | 6320838 | 8/1988 | | H04N/13/00 |
| JP | 213379 | 1/1990 | | H04N/7/14 |
| JP | 2218289 | 8/1990 | | H04N/13/02 |
| JP | 5210181 | 8/1993 | | G03B/35/00 |
| JP | 0605141 | 2/1994 | | G03B/35/00 |
| JP | 0800192 | 1/1996 | | B41J/2/00 |
| JP | 0800712 | 1/1996 | | G06T/15/00 |
| JP | 0816359 | 6/1996 | | H04N/13/02 |
| JP | 0921175 | 8/1997 | | G03B/35/18 |
| JP | 1009081 | 4/1998 | | G03B/35/10 |
| JP | 1022177 | 8/1998 | | G03B/19/22 |
| JP | 1027153 | 10/1998 | | H04N/13/02 |
| JP | 1028561 | 10/1998 | | H04N/13/02 |

* cited by examiner

Primary Examiner—Ngoc-Yen Vu
Assistant Examiner—Rashawn N Tillery
(74) Attorney, Agent, or Firm—A. Bruce Clay

(57) ABSTRACT

A camera system including a plurality of image capture devices and supporting output of data from data storage arrays of each image capture device in a segment-by-segment manner, with output lines arranged in an interleaved manner so that interleaving is automatically achieved without complex image processing. The interleaved image or video output of such a camera system will appear as a three dimensional image when viewed through a screen of lenticular lenses.

6 Claims, 3 Drawing Sheets

CAMERA SYSTEM FOR THREE DIMENSIONAL IMAGES AND VIDEO

FIELD OF INVENTION

The present invention relates to camera systems including a plurality of image capture devices for achieving three dimensional effects.

BACKGROUND OF INVENTION

Real time, full colour, three-dimensional television has been provided in the past, but no solution has been entirely satisfactory. One solution uses two cameras and two television displays, with the displayed images polarised with their optical plane 90 degrees to each other. The viewer then views the image using polarising glasses so that each eye sees only one screen image. A second solution displays overlapping red and green images via a single display and the viewer wears colour-filter glasses so that each eye sees one image only. The requirement to wear special glasses and their disorientating effect, and the expense of two required displays, have proven unpopular. More recently, immersive television and video applications have included head-mounted displays, but these are similarly disorientating and restrictive for the wearer.

In an article "Time-multiplexed autostereoscopic camera system" by Dodgson et al, University of Cambridge Computer Laboratory, Cambridge, UK, a camera system has been described which provides live 3D video input for a time-multiplexed autostereoscopic display (i.e. stereoscopic without special glasses). Multiple input video streams from an array of standard analog video cameras, one for each view direction, are digitised and then time-multiplexed into a single video output stream. The video is then displayed to the user using a field sequential (time-multiplexed) scheme where light emitted from a conventional screen is then directionally modulated so that each field in the sequence is visible only over a narrow view angle in front of the display. Significant processing resources and control circuitry are required for the multiplexing including synchronisation.

U.S. Pat. Nos. 3,852,787, 3,953,869, 3,960,563 and 4,132,468 disclose generating a stereoscopic (3D-effect) picture from still photographic images by interleaving slices or bands from a number of images (each image being a view of the same scene from a slightly different viewpoint) and using a lenticular screen to view the interleaved image such that each eye of the viewer sees bands from a different one of the images. Images are firstly captured and then image slices are selected and used to generate an interleaved image on a film, for example by projecting onto the film. The lenticular screen may be laminated to the photographic paper which bears the interleaved image slices, with each lenticule aligned with a different lineform image slice. However, the methods and mechanisms for generation of interleaved messages disclosed in these patents are relatively complex, and hence expensive to implement. Furthermore, they are not adapted for real-time processing of live video.

U.S. Pat. No. 5,063,441 discloses an analog stereoscopic video camera enabling image sensor position adjustment to avoid inherent geometric distortions which would otherwise cause vertical parallax. The interocular separation distance is changed to correctly converge the image without distortion. It is stated in U.S. Pat. No. 5,063,441 that the camera could be used to produce interdigitated lenticular stereoscopic displays, if suitable image processing controls are used to process the outputs of the image forming sensors to generate 'slices' from the captured images, and then sets of the slices could be juxtaposed behind the lenticules of a lenticular display screen. However, U.S. Pat. No. 5,063,441 does not disclose any method or means for generating the image 'slices' or combining them in an interdigitated image, stating that this is "beyond the scope of this disclosure".

There remains a need for camera systems for producing three-dimensional still images and cameras systems for producing three-dimensional video without the processing overhead of the system described by Dodgson et al, and to provide a solution to the problem of how to generate and to appropriately combine slices or bands of captured two-dimensional images and video frames. There is also a need for a three-dimensional camera which is less complex than currently available cameras and hence is less expensive to produce.

DISCLOSURE OF INVENTION

In a first aspect, the present invention provides a camera system including a plurality of image capture devices and one or more storage arrays, either within the image capture devices or connected thereto for receiving image output information therefrom, wherein the one or more storage arrays have output connections arranged for retrieval of segments of the plurality of images captured by said plurality of image capture devices, the output connections being in an interleaved arrangement such that the segments of the plurality of images are interleaved between each other. A three-dimensional effect can be achieved when the interleaved output image is viewed through a lenticular screen.

The invention thus achieves interleaving of image segments by an arrangement of physical connections, avoiding the need for inclusion of specialist image processing components to achieve this. The invention can be implemented in both still-image cameras and video cameras.

The output comprising interleaved image segments can then be transferred to non-volatile data storage within the camera system (such as flash memory in a digital-output camera system) or to a transmission controller. The stored or transmitted image or video data is then displayed via a lenticular-screen display device. When displayed, each eye of a viewer sees a different set of image segments due to viewing the lenticules of a lenticular screen from a slightly different angle.

Preferably, a camera system according to the invention includes a plurality of lenses each in optical alignment with a respective image capture device comprising an array of photosensitive elements or other image sensor elements. The array of image sensor elements either comprises, or is connected for transfer of information to, an array of cells capable of storing the captured image information. This storage array is preferably a digital storage array having address line and output data line connections enabling data retrieval directly from the cells of the storage array either for transfer to non-volatile storage or for transmission. The arrangement of the physical connections between the elements of the array of image sensors and the output data lines is such that the information output via the output data lines comprises interleaved image segments from the plurality of image capture devices.

In one embodiment, the image sensors are analogue and each image capture device includes its own dedicated digital storage array, with each element of an array of analogue photosensitive elements transferring the information represented by its accumulated charge to a corresponding position in the respective digital storage array via an analogue-to-digital converter.

The arrangement of output connections to achieve interleaving of image segments preferably involves adjacent output data lines (and, in certain embodiments, their corresponding address lines) each being directly connected to a segment (a column or row of cells) of a different one of the plurality of storage arrays.

For example, in a camera system including three lenses and three image sensor arrays, the output connections may be arranged such that information from a first column of a first digital storage array connected to a first sensor array is output adjacent the information from the second column of a second array, then the third column of a third array, then the fourth column of the first array, then the fifth column of the second array, and so on. Note that in this example, the output connections provide a selection of only partial information from each array (e.g. selecting first, fourth, seventh columns, etc from the first array) rather than using all of the available information. This has the practical advantage of enabling conventional image sensor arrays such as charge coupled device (CCD) arrays to be used and yet the output signal which combines information from each of them includes the same number of pixels per frame as if it were an output signal from a camera having only a single conventional sensor array. The combined output signal can therefore be treated as a conventional output signal (performing standard formatting, etc) except that a lenticular display screen is required for final viewing.

The omission of partial information from each view of the object being photographed or filmed does not entail a reduction in quality of the image as seen by the viewer because each partial image is supplemented by other partial images from different viewing angles, such that the total information available to the viewer is as complete as would be obtained from a conventional single CCD array camera, but with the benefit of a three-dimensional perspective. A proportion of the image information available for capture by each capture device can be discarded without any significant effect on the final television or video image as perceived by the viewer because of the capacity of the human brain to compensate for partially missing information.

In an alternative embodiment of the invention, each image capture device has a sensor array with a reduced number of photosensitive elements and corresponding storage cells as compared with conventional-sized image sensor and storage arrays, and then all of the segments of the storage array are actually used during generation of the interleaved image. In this embodiment, each column of each storage array is physically connected to an appropriate output data line arranged in an interleaved manner. This is a further simplification of the camera system as compared with known three-dimensional cameras, allowing use of less expensive image capture devices by making use of the inventor's recognition that less information needs to be captured by each image capture device when the camera system uses multiple image capture devices to produce an interleaved image.

In a further embodiment of the invention, a shared digital storage array is connected to receive information from each of the plurality of arrays of image sensor elements, simplifying the required hardware as compared with embodiments which include a dedicated digital storage array for each sensor array. In this embodiment, the input connections to the shared array from the arrays of image sensor elements may be arranged such that the single shared storage array receives interleaved image segments from the plurality of image capture devices. The output connections from this single storage array can then be a conventionally arranged set of output lines since the images are already interleaved.

The present invention may be implemented in a digital camera for generating three-dimensional still images, with the output images being suitable for viewing through a lenticular screen. It is known for such screens to be physically attached to photographic paper. Such a lenticular screen could alternatively be positioned on the viewer's side of a projector screen which has interleaved images projected onto it from behind (i.e. the projector is on the far side of the screen from the viewer).

The invention may also be implemented in a digital video camera, with the control of the clocking of information into a digital storage array (input buffer) and repeated outputting and then overwriting of the storage array being handled by the image capture device (as is known in the art for CCDs).

The present invention is simpler and hence cheaper to implement than time multiplexing of analogue input video streams (the invention does not require software-controlled image processing subsequent to digitising, and the invention according to a preferred embodiment also does not require as many image buffers for the different cameras). The preferred embodiment of the present invention is also less error prone since it is less time-critical. Synchronisation remains a significant technical problem for any time-multiplexing solution.

A further embodiment of the invention includes additional output data lines from a first storage array of a first one of the capture devices and a switching capability allowing the user to select between non-interleaved output (i.e. output from only the first storage array for conventional two-dimensional images or video) and interleaved (three-dimensional) output.

Further embodiments of the invention include thermal image capture systems and other systems for capturing signals other than visible light, and the term "camera" should be interpreted sufficiently broadly to cover such systems.

BRIEF DESCRIPTION OF DRAWINGS

Preferred embodiments of the present invention will now be described in more detail, by way of example only, with reference to the accompanying drawings in which.

DESCRIPTION OF PREFERRED EMBODIMENTS

Figure 1:
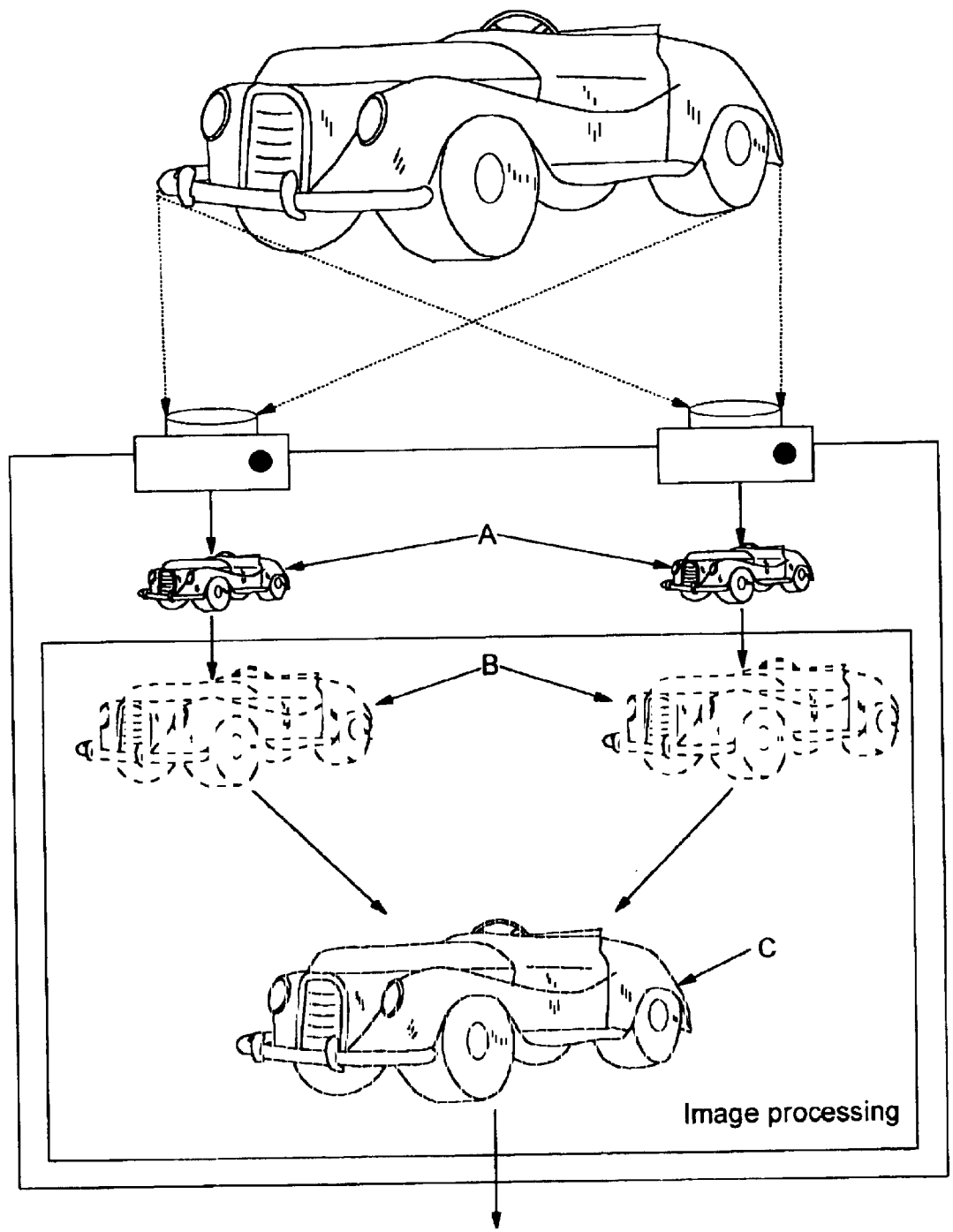
FIG. 1 is a schematic representation of the generation of an interleaved image by a prior art three dimensional camera system.

As shown in FIG. 1, a camera system 10 includes a plurality of lenses 20 each in optical alignment with a respective image capture device 30 (two capture devices are shown in the figure). The lenses are arranged in a straight line with their optical paths parallel to each other.

In three-dimensional camera systems which are described in the prior art, the images (A) captured by each of the capture devices are digitised and then passed to an image processing unit 40 which performs a number of functions to generate an interleaved image combining elements of each of the captured images. The image processing unit is an expensive component of the system. The image processing involves selection of segments (B) of each of the images (A), and interleaving of the selected segments (B) to generate a final combined image (C) (i.e. as a still image in an output buffer or as an output video stream). The interleaved image may then be recorded on film or photographic paper or a computer readable storage medium such as magnetic storage.

Figure 2:
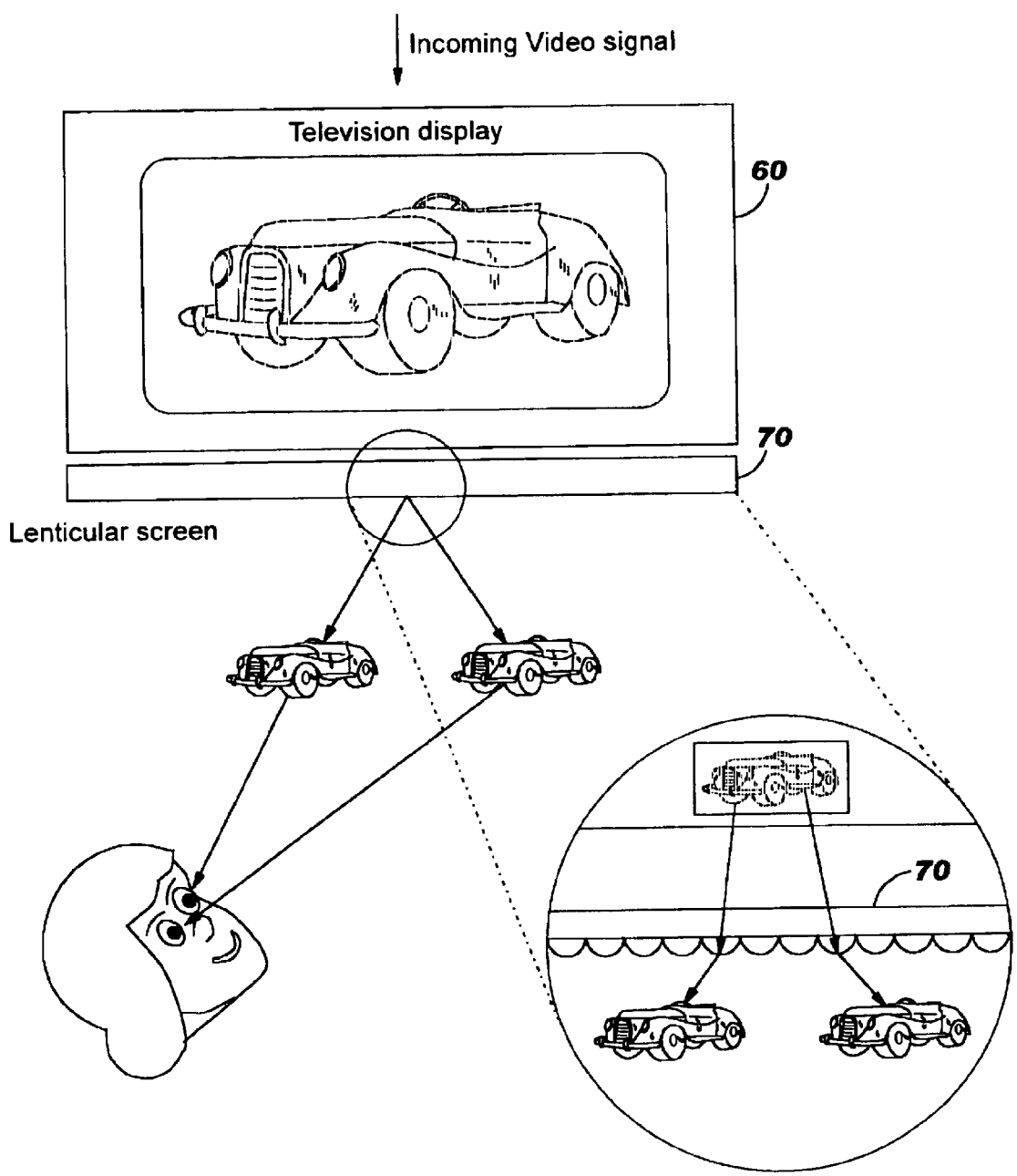
FIG. 2 is a schematic representation of a lenticular-screen display system for use with interleaved images.

As is known in the art, such an interleaved image appears to be three-dimensional when displayed on an output device 60 or photographic paper and viewed by a person through a lenticular screen.70. A plano-convex lenticular screen 70 is shown schematically in FIG. 2. Each of the lenticules is positioned in alignment with the interleaved slices of the image. Each lenticule 80 is arranged to overlay n slices where n is the number of image capture devices. Precise horizontal alignment is not essential, although substantial skew of the lenticules relative to the image slices must be avoided.

Figure 3:
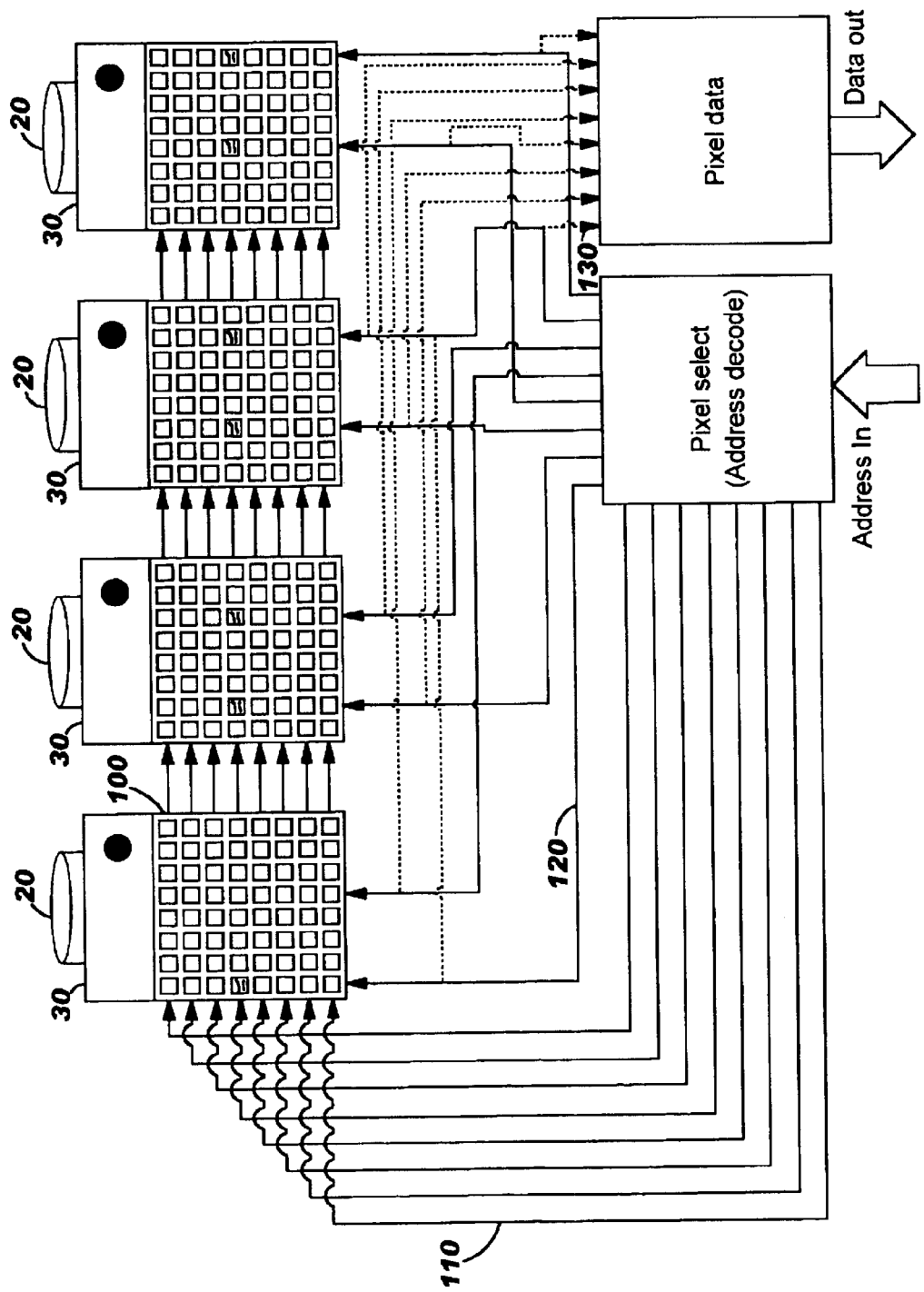
FIG. 3 is a simplified representation of address line and output data line connections from a plurality of CCD storage arrays of a camera system according to a first embodiment of the invention.

Components of a camera system according to an embodiment of the present invention are shown in FIG. 3. This embodiment will now be described in detail. Each of the plurality of image capture devices 30 comprises a CCD array embedded in a semiconductor substrate such as a silicon substrate and in optical alignment with a lens 20. Alternative image sensors include phototransistors, light sensitive diodes, and digital image sensors including thermal sensors.

As is known in the art, exposure of the photosensitive elements of a CCD array to light energy results in generation of electron-hole pairs at the electrodes of each CCD element, the number of electron-hole pairs at each electrode being a function of the light intensity. The minority charge carriers accumulate in a potential well at the electrodes of the CCDs (forming a depletion region in the semiconductor substrate adjacent the electrode, while the majority carriers migrate into the bulk material of the substrate). The voltages corresponding to the accumulated charge at the electrodes of the CCD array are then output as a serial stream using a step-by-step shifting, as is known in the art. This stream of information is digitised by means of an analogue-to-digital converter and then transferred to a digital storage array 100 which maps to the respective CCD array. Only a very small number of cells is shown in the storage array 100 of FIG. 3 for simplicity—much larger arrays are clearly required for satisfactory image resolution and a grid of 512×512 or 1024–1024 cells is typical. (Of course, no such digitising and subsequent transfer of information to a digital storage array is required in alternative embodiments which include a digital sensor array for image capture.)

The information in the storage array 100 can then be read via an arrangement of address lines 110, 120 and output data lines 130 which provide for a pixel-by-pixel access to the cells of the storage array. The present invention achieves a more efficient and/or less error prone generation of interleaved images than three-dimensional camera systems described in the prior art, as will now be described. The interleaved images can be viewed through a lenticular screen 70 as described above and as is known in the art.

Each row if each -storage array 100 has a connected address line 110 and every 4th column of the array,(where n=4 is the number of image capture devices in the camera system) has a connected address line 120 and output data line 130, as shown in FIG. 3.

Instead of data being read from all cells of the storage array 100 and transferred to an image processing unit for generating an interleaved image under software control, an interleaved still image or video output is achieved by interleaving the output data line connections. A first address line ad,a corresponding output data line connect to a first column of a first storage array 100, and a second address line and output data line connect to a second column of a second array, and then the next adjacent address line and data line connect to a third column of a third storage array, and so on as shown in FIG. 3. This arrangement of address and data lines ensures that a conventional addressing sequence applied to the address lines for accessing data in the arrays will access a set of the columns of the plurality of storage arrays in an alternating arrangement.

This arrangement of address and data line connections achieves an interleaved output image suitable for viewing through a lenticular screen, without the need for complex image processing components.

A second embodiment of the present invention has an equivalent arrangement of interleaved output data connections, but uses storage arrays having greatly reduced numbers of storage cells such that the only columns of storage cells provided in the storage array are the ones to which output data lines and address lines are actually connected. If the camera system has n image capture devices, with segments of the image captured by each device being used to generate an interleaved image having P rows and Q columns of pixels, then each storage array only requires P rows and Q/n columns. The image sensor arrays can have correspondingly reduced numbers of sensor elements. This hardware reduction has the benefit of enabling use of inexpensive image capture devices, for example using a simpler mask for producing the silicon devices for CCD sensor arrays.

The above discussion about a reduction in the number of columns of a storage array and sensor array should be interpreted as including the alternative of a reduced number of rows if the three dimensional effect is to be achieved by interleaving of rows.

Camera systems according to the invention may additionally include a digital storage array 140 within the camera system for storing the interleaved image data—the plurality of images are sliced directly into this array. The image data may then be transferred from this digital memory array to an output device 60 or a non-volatile storage device. It is known for digital cameras to include compact flash memory or SmartMedia as well as 2 to 4 MB of built in memory. CCDs include clocking controls for controlling appropriately timed transfer of image information.

Alternatively, a shared digital storage array may be arranged in n sectors with a first sector receiving input from a first image capture device, a second sector receiving input from a second capture device, and so on, with no interleaving of segments of the sectors within the storage array. The interleaving of connections to provide an interleaved output is then provided at the output side of the common storage array.

The present invention includes embodiments which include a plurality of dedicated storage arrays for each image capture device and an additional shared storage array to which data from the dedicated arrays is transferred by interleaved connections for generation of an interleaved still image or video output.

The embodiments described above which include address lines rely on a connected device (for example, a personal computer) to submit address information to retrieve the captured data, and the personal computer can implement timing control for the outputting of data. Also within the scope of the present invention are video cameras which interleave image information as described above and which include a video encoder for outputting a sequenced video stream for transfer to a video display device. In such an embodiment, no addressing circuitry is required since a "push down" outputting of video is implemented.

It is possible to modify each of the above-described embodiments of the invention in a way that enables users of the camera system to select whether 'two dimensional' (i.e. non-interleaved) or 'three dimensional' (i.e. interleaved) results are output. In this aspect of the invention, a first storage array of a first image capture device comprises a "complete array" (i.e. no columns omitted) and has, in addition to the previously described output data lines, a further set of output data lines connected to each of its columns. A switch is then provided which enables the user to determine which set of connections are to be used for generating an output image—i.e. either connections to all columns of a single storage array or interleaved connections to only a subset of columns of a plurality of storage arrays.

For ease of understanding, the above embodiment has been described as if it were a monochrome camera system. Colour images can be achieved by replacing each single cell of a sensor array with a group of three separate subcells, with each subcell representing one of YUV (luminance and two chrominance values) or one of red, green and blue. The information held in each subcell is output via a suitable filter. An alternative solution for providing colour images is to have a separate array of sensor elements for capturing each colour, each aligned with a prism block or the like to achieve convergence of signals from the cells which have corresponding positions in the red, green and blue arrays.

Alternatively, colour images can be achieved very simply by striping columns of cells in alternating red, green and blue filters. That is, of the pixels which are used for luminance (as described above), every third pixel represents one of the three colours. In a camera system comprising n=4 image capture devices, with only every 4th column of each array having a connected output line, then the striping of columns of cells through colour filters is performed with consideration of the output connections such that in a first array, for example, the 1st column is used for red, 5th column is green, 9th column is blue, 13th column is red, and so on (and columns 2, 3, 4, 6, 7, 8, 10, 11 and 12 are not used). This simple solution has limited colour resolution (since any single colour has only ⅓ of the luminance resolution) especially for subjects with narrow vertical bands of colour.

What is claimed is:

1. A camera system including:
   n image capture devices having:
   respective n lenses arranged such that optical paths of each of said n lenses are substantially parallel to each other and each of said n lenses are located along a substantially perpendicular axis to said optical paths;
   a respective n storage arrays, said n storage arrays either being integrated within said n image capture devices or being connected thereto for receiving image output information therefrom, wherein said n storage arrays have output connections arranged for retrieval of segments of a plurality of images captured by said n image capture devices:
   an array of image sensor elements for each of said n image capture devices comprising or connected to a dedicated storage array for receipt of information from said array of image sensor elements;
   said output connections being in an Interleaved arrangement such that the segments of the plurality of images are interleaved between each other to produce an interleaved stereoscopic image, and to access segments of each of the dedicated storage arrays interleaved between segments of each of the other arrays; and
   wherein each said dedicated storage array has P rows and Q columns, a first set of P address lines being connected to the P rows and a second set of Q/n address lines and corresponding Q/n output data lines being connected to an equally spaced selection of Q/n of the Q columns, wherein said output data lines from each of said n image capture devices are interleaved to produce an interleaved image of P rows and Q columns.

2. A camera system according to claim 1, including a shared storage array connected to receive information from each of the plurality of image capture devices, wherein the connections between the image sensor elements and the shared storage array are arranged such that the shared storage array will receive information from sectors of each array of image sensor elements of the plurality of image capture devices interleaved with information from sectors of other image sensor arrays of the plurality of image capture devices.

3. A camera system according to claim 1, including a common storage array organised as a set of distinct sectors each connected to receive information from one of the plurality of image capture devices, wherein output data line connections to the sectors of the common storage array are interleaved such that the information output via the output data lines comprises interleaved image segments from the plurality of digital image capture devices.

4. A camera system according to claim 1, including a plurality of lenses each in optical alignment with a respective digital Image capture device comprising an array of image sensor elements, the image sensor elements being connected for transfer of information to respective cells of a digital storage array, wherein the storage array has address line and output data line connections enabling data retrieval directly from the cells of the storage array either for transfer to non-volatile storage or for transmission, the arrangement of the physical connections between the elements of the array of image sensor elements and the cells of the storage array and the output data lines being such that the information output via the output data lines comprises interleaved image segments from the plurality of digital image capture devices.

5. A camera system according to claim 1, wherein one of the image capture devices includes non-interleaved output connections which are switchably selectable to enable selection between output of a non-interleaved image from a single image capture device and output of an interleaved image from the plurality of image capture devices.

6. An image capture device having a respective lens, for use in a camera system including a plurality n of such capture devices with the respective plurality of lenses being in an arrangement such that the optical paths of the lenses are substantially parallel to each other and the plurality of lenses are located along a substantially perpendicular axis to the optical paths and with their outputs connected in an interleaved manner to generate interleaved stereoscopic output images having P rows and Q columns of pixels, the device including an array of image sensors also having P rows and Q/n columns and a storage array having P rows and Q/n columns connected to receive information from the array of image sensors.

* * * * *